(12) United States Patent
Takahashi et al.

(10) Patent No.: US 7,488,125 B2
(45) Date of Patent: Feb. 10, 2009

(54) OPTICAL FIBER FUSION SPLICER AND COVERING DEVICE FOR HIGH VOLTAGE PART THEREOF

(75) Inventors: Kenji Takahashi, Chiba (JP); Taku Otani, Chiba (JP); Manabu Tabata, Chiba (JP)

(73) Assignee: Fujikura Ltd., Tokyo (JP)

( * ) Notice: Subject to any disclaimer, the term of this patent is extended or adjusted under 35 U.S.C. 154(b) by 787 days.

(21) Appl. No.: 11/039,911

(22) Filed: Jan. 24, 2005

(65) Prior Publication Data

US 2005/0163447 A1    Jul. 28, 2005

(30) Foreign Application Priority Data

Jan. 23, 2004    (JP)    ............ P2004-015821

(51) Int. Cl.
G02B 6/255    (2006.01)
C03B 37/028    (2006.01)

(52) U.S. Cl. ............ 385/95; 385/97; 385/98; 385/96; 385/137; 65/501

(58) Field of Classification Search ........ 385/95, 385/96, 97, 98, 99, 100, 134, 136, 137, 138; 65/501

See application file for complete search history.

(56) References Cited

U.S. PATENT DOCUMENTS

| | | | | |
|---|---|---|---|---|
| 4,735,481 A | * | 4/1988 | Lukas et al. | ............ 385/139 |
| 5,218,184 A | * | 6/1993 | Hakoun et al. | ............ 219/383 |
| 5,481,640 A | * | 1/1996 | Harman et al. | ............ 385/147 |
| 6,764,230 B1 | * | 7/2004 | Karacsony et al. | ............ 385/98 |
| 2005/0163447 A1 | * | 7/2005 | Takahashi et al. | ............ 385/134 |

FOREIGN PATENT DOCUMENTS

| | | |
|---|---|---|
| JP | 11-316315 | 11/1999 |
| JP | 2000-137135 | 5/2000 |

* cited by examiner

*Primary Examiner*—Brian M Healy
(74) *Attorney, Agent, or Firm*—Sughrue Mion, PLLC

(57) ABSTRACT

A covering device for a high voltage part in an optical fiber fusion splicer includes a cover body, removably connectable to a support table, including an electrode holder adapted to removably hold an electrode rod. The covering device includes an electrode retainer removably connectable to the cover body, adapted to press the electrode rod against the support table.

20 Claims, 6 Drawing Sheets

OPTICAL FIBER FUSION SPLICER AND COVERING DEVICE FOR HIGH VOLTAGE PART THEREOF

CROSS-REFERENCE TO RELATED APPLICATIONS

This application is based upon and claims the benefit of priority from Japanese Patent Application No. 2004-15821 filed on Jan. 23, 2004 in the Japanese Patent Office; the entire contents of which are incorporated herein by reference.

BACKGROUND OF THE INVENTION

The invention relates to an optical fiber fusion splicer configured to perform fusion splicing of optical fibers. The invention also relates to a covering device for a high voltage part of an optical fiber fusion splicer configured to supply electricity to electrode rods. More specifically, the invention relates to the covering device capable of removing and replacing the electrode rods easily.

Such a conventional optical fiber fusion splicer is configured to fit electrode rods to be removable (see Japanese Unexamined Patent Publications No. 11(1999)-316315 and No. 2000-137135). Specifically, the optical fiber fusion splicer includes a pair of support tables facing each other on a base table. Each of the support tables includes a V-groove on the top face for positioning an electrode rod. The optical fiber fusion splicer also includes electrode retainers provided to the V-grooves. Each of the electrode retainers presses the electrode rod and thereby positions the electrode rod in the V-groove. This electrode retainer is fixed to the top face of the support table by use of a fitting screw. The optical fiber fusion splicer further includes electrode covers each configured to cover the electrode retainer at the high voltage portion for safety.

When removing and replacing the electrode rod, the electrode cover is firstly removed from the support table. Then, the electrode retainer is removed from the support table by loosening the fitting screw. Thereafter, the electrode rod is removed from the support table.

To fit a new electrode rod, a new electrode is firstly engaged with and positioned in the V-groove on the top face of the support table. Then, the electrode retainer is placed on the top face of the support table and the fitting screw is tightened. In this way, the electrode rod is fixed onto the support table by use of the electrode retainer.

As described above, when the fitting screw is tightened to fix the electrode retainer, it is necessary to retain a space between the tips of the pair of electrode rods correctly. For this reason, the fitting screw is tightened while maintaining a state where the top of an electrode rod collar having a large diameter, which is provided on the base end of the electrode rod, is pressed to abut against the support table. Then, after fixing the electrode retainer, the electrode cover is fitted to the support table to cover the electrode retainer.

In other words, removal of the conventional electrode rods requires two steps of removing the electrode cover and then removing the electrode retainer. These steps are quite cumbersome. Meanwhile, when fitting the electrode retainer, the fitting screw is tightened while pressing the electrode rod collar of the electrode rod in a small space. Such a fitting process needs an improvement in terms of operability.

BRIEF SUMMARY OF THE INVENTION

The first aspect of the invention provides a covering device for a high voltage part in an optical fiber fusion splicer. The covering device includes a cover body, removably connectable to a support table, including an electrode holder adapted to removably hold an electrode rod. The covering device includes an electrode retainer, removably connectable to the cover body, adapted to press the electrode rod against the support table.

The electrode retainer may include a fitting screw adapted to fix the electrode retainer to the support table. The cover body may include a tool insertion hole allowing access to the fitting screw. The fitting screw may extend through the electrode retainer. The fitting screw may include a head interposed between the electrode retainer and a top wall of the cover body. A radial dimension of the tool-insertion hole may be smaller than a radial dimension of the head of the fitting screw.

The electrode holder may include a pair of holding pawls removably holding the electrode rod therebetween along the circumferential direction of the electrode rod. The electrode holder may also include a top pressing pawl pressing against the top of the electrode rod. The electrdode rod also may have an electrode rod collar having a larger radial dimension than other portions of the electrode rod, and the pair of holding pawls and the top pressing pawl may engage with the electrode rod collar.

The electrode retainer may have a light source housing adapted to house an illumination light source. Further, the cover body may be formed of an insulating material, the electrode and electrode retainer may be formed of an electrically conductive material, the cover body, electrode retainer and electrode may be removable in one piece from the support table, and the table may comprise a top face with a V-groove, and the electrode rod may be pressed into the V-groove by the electrode retainer.

The second aspect of the invention provides an optical fiber fusion splicer. The splicer includes an electrode adapted to splice a first optical fiber and a second optical fiber. The splicer further includes a retainer adapted to retain the electrode in a position relative to the optical fiber fusion splicer. The splicer further includes a holder holding the electrode and the retainer.

The holder may include a first arm and a second arm having the electrode interposed between the first and second arms.

At least one of the first and second arms may have a pawl engaged with the electrode.

The retainer may be electrically connected to the electrode.

The optical fiber fusion splicer may include a positioner configured to position the first and second optical fibers in positions relative to the electrode.

The holder may be removably attached to the optical fiber fusion splicer, and may hold the electrode and retainer both when attached and detached from the optical fiber fusion splicer.

According to the aspects, the removal of the cover body from the support table allows the electrode retainer, the electrode rod and the cover body to be collectively removed. Then, the electric rod is removed from the electrode holder of the cover body, a new electric rod is fitted to the electrode holder for replacement, and thereafter the cover body is fitted to the support table. This achieves easy fitting or removal of the electrode rod.

BRIEF DESCRIPTION OF THE ACCOMPANYING DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the invention will now be described below by reference to the attached Figures. The described exemplary embodiments are intended to assist the understanding of the invention, and are not intended to limit the scope of the invention in any way.

Figure 1:
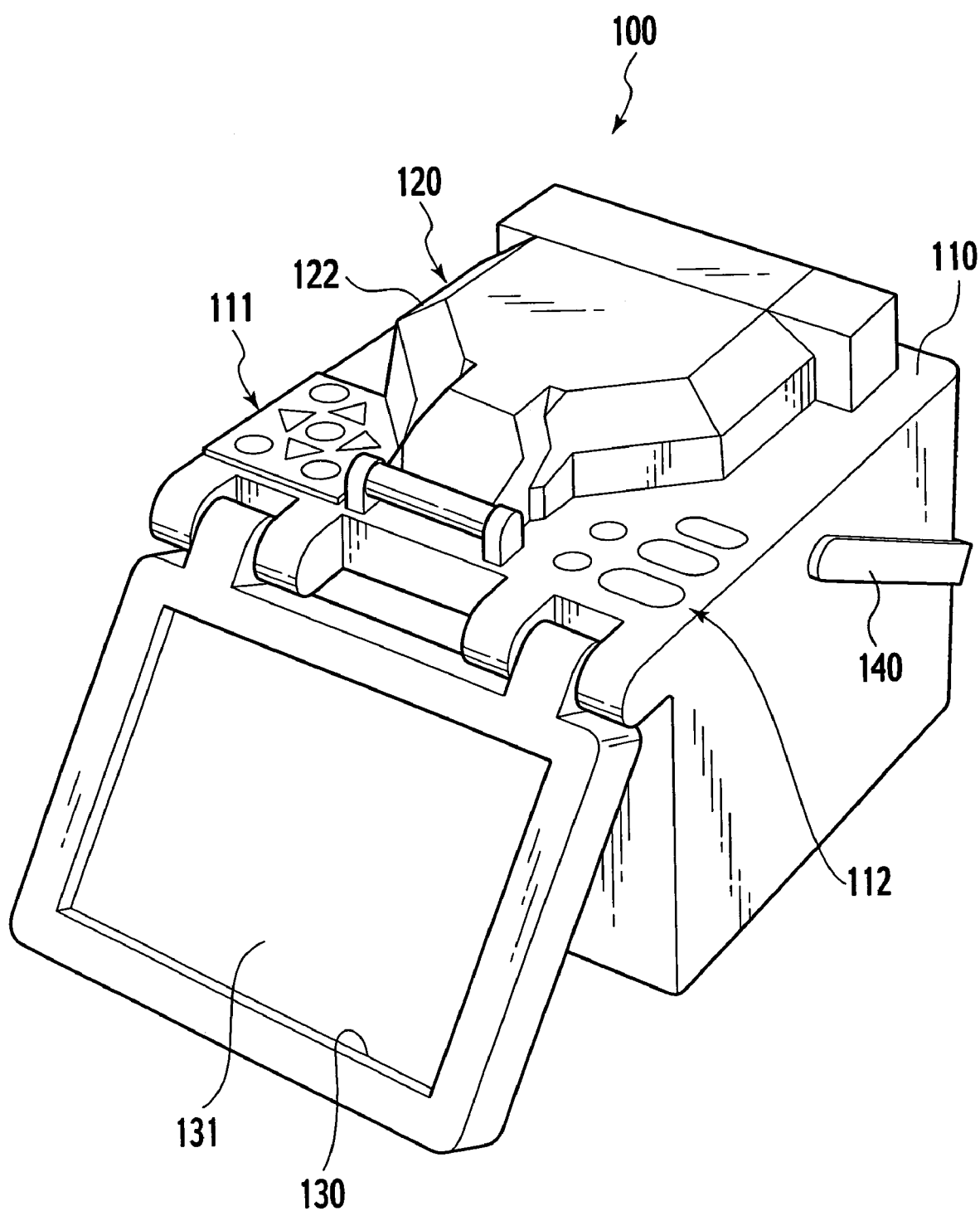
FIG. 1 is a perspective view of an optical fiber fusion splicer according to an embodiment of the invention.

Referring to FIG. 1, an optical fiber fusion splicer 100 includes a fusion splicing part 120 on the top face of a casing 110. The fusion splicer 100 includes a monitor 130 which is rotatably supported by the casing 110. The monitor 130 includes a display 131 for displaying the process of a fusion splicing between pairs of optical fibers. The fusion splicer 100 includes groups of switches 111 and 112 for operation on the top face of the casing 110. The fusion splicer 100 includes a handle 140 for carriage that is fitted to the casing 110.

Figure 2:
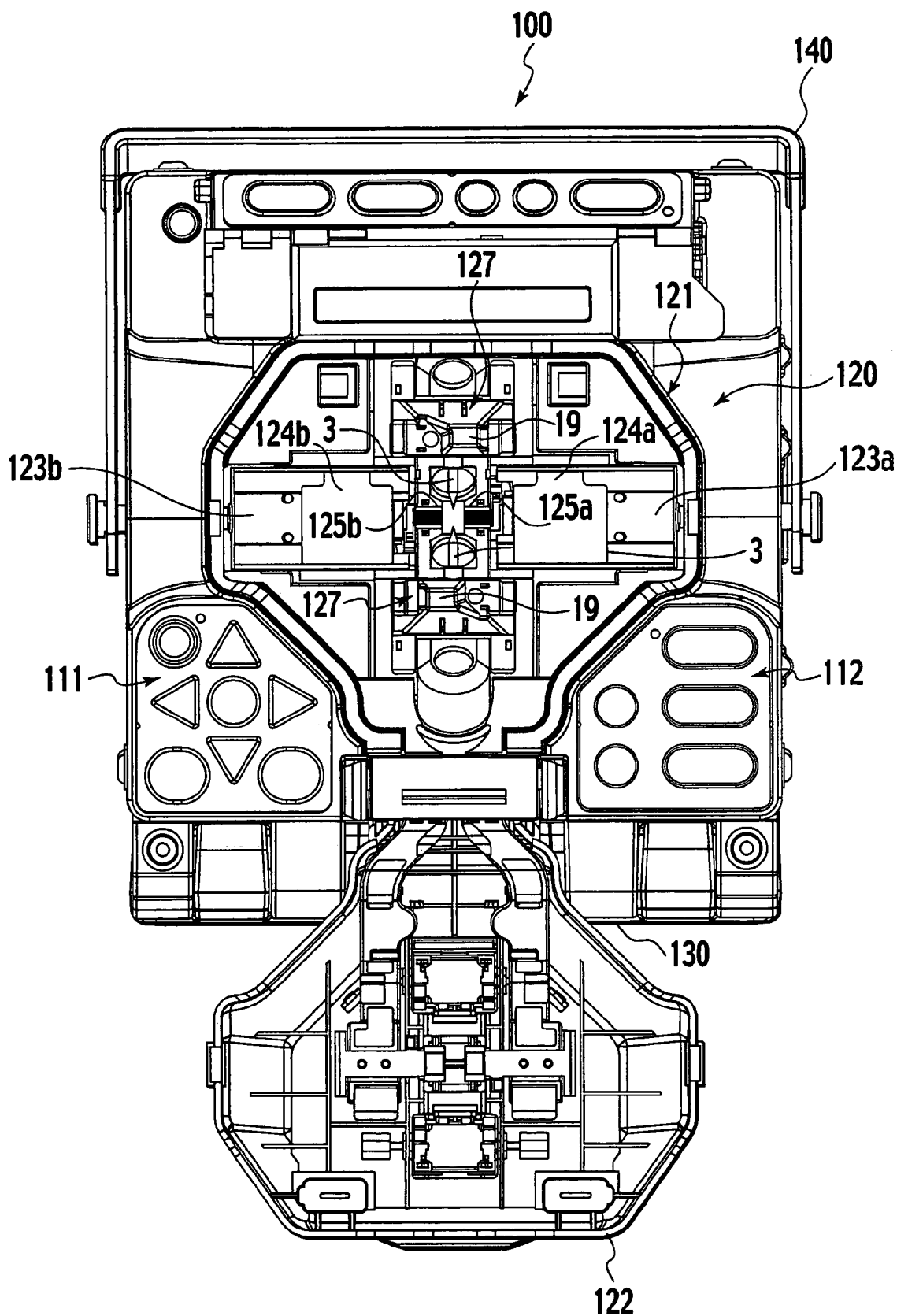
FIG. 2 is a top plan view of the optical fiber fusion splicer of FIG. 1, in which a cover is opened.

Referring to FIG. 2, the fusion splicing part 120 includes a cover 122 for covering a work-space 121. The fusion splicing part 120 includes a pair of work-tables 123a and 123b facing each other. Work-tables 123a and 123b are used to place optical fiber cords or optical fiber ribbon cords. The fusion splicing part 120 includes holders 124a, 124b openable or closable to the work tables 123a, 123b using hinges. The fusion splicing part 120 includes a pair of elongated stages 125a and 125b. Each of the stages 125a and 125b includes grooves extending in the longitudinal direction thereof. The stages 125a and 125b are displaceable in the longitudinal direction and in the transverse direction, and are configured to automatically align optical fibers in the grooves. The fusion splicing part 120 includes a pair of discharge systems 127 facing each other, with the stages 125a and 125b interposed between the discharge systems 127.

Figure 3:
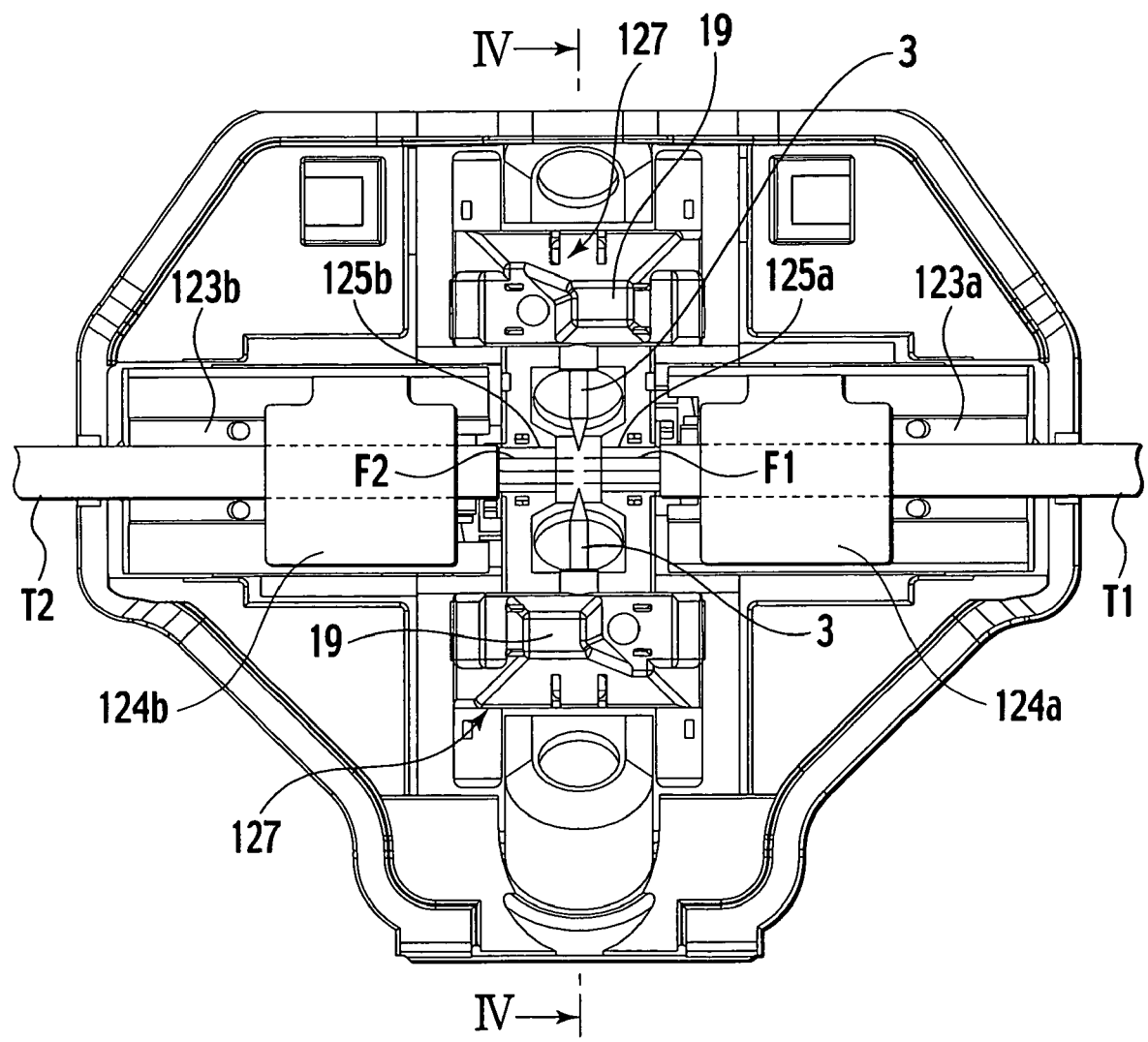
FIG. 3 is an enlarged plan view of a discharge system shown in FIG. 2.
Figure 4:
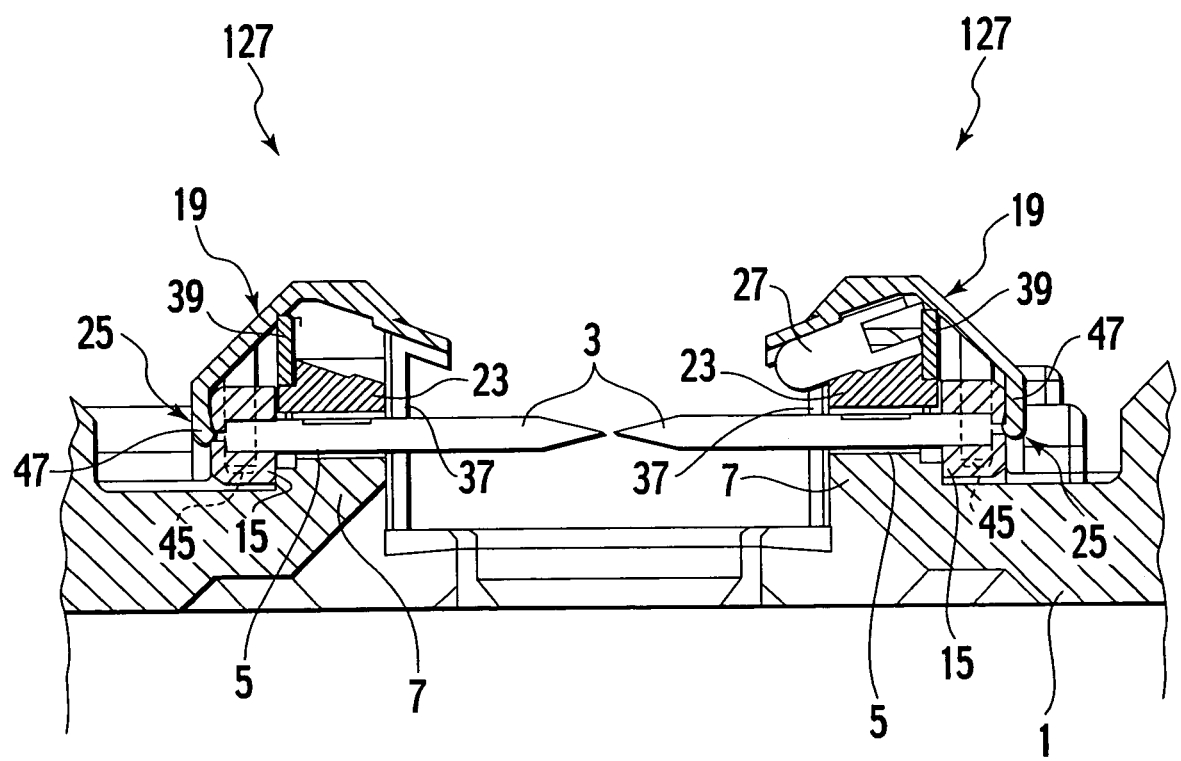
FIG. 4 is a schematic cross-sectional view of the discharge system taken along the IV-IV in FIG. 3.

Referring to FIGS. 3 and 4, discharge systems 127 include a pair of electrode rods 3 facing each other. The discharge systems 127 include a pair of support tables 7 facing each other on a table 1. Each of the support tables 7 includes a V-groove 5 on the top face thereof for positioning the electrode rod 3. Each of the discharge systems 127 includes a cover body 19 as a holder which is removably fitted to the support table 7. The cover body 19 covers a high voltage part provided for supplying electricity to the electrode rod 3. The cover body 19 is made of resin. This cover body 19 includes engagement legs 21, which protrude downward, on both lower ends thereof (see FIG. 5). The engagement legs 21 are engageable with and disengageable from engagement recesses (not shown) formed either on the support table 7 or on the table 1.

Accordingly, the engagement legs 21 provided on the cover body 19 are engaged with and disengaged from the engagement recesses provided on the support table 7. In this way, the cover body 19 is fitted to and removed from the support table 7.

Each of the discharge systems 127 includes an electrode retainer 23 inside the cover body 19. The electrode retainer 23 presses the electrode rod 3 against the support table 7 and thereby fixes the electrode rod 3 thereto. The electrode retainer 23 supplies electricity to the electrode rod 3. Each of the discharge systems 127 includes an electrode holder 25 which is provided inside the cover body 19. The electrode holder 25 retains the electrode rod 3 to be removable from the cover body.

Figure 5:
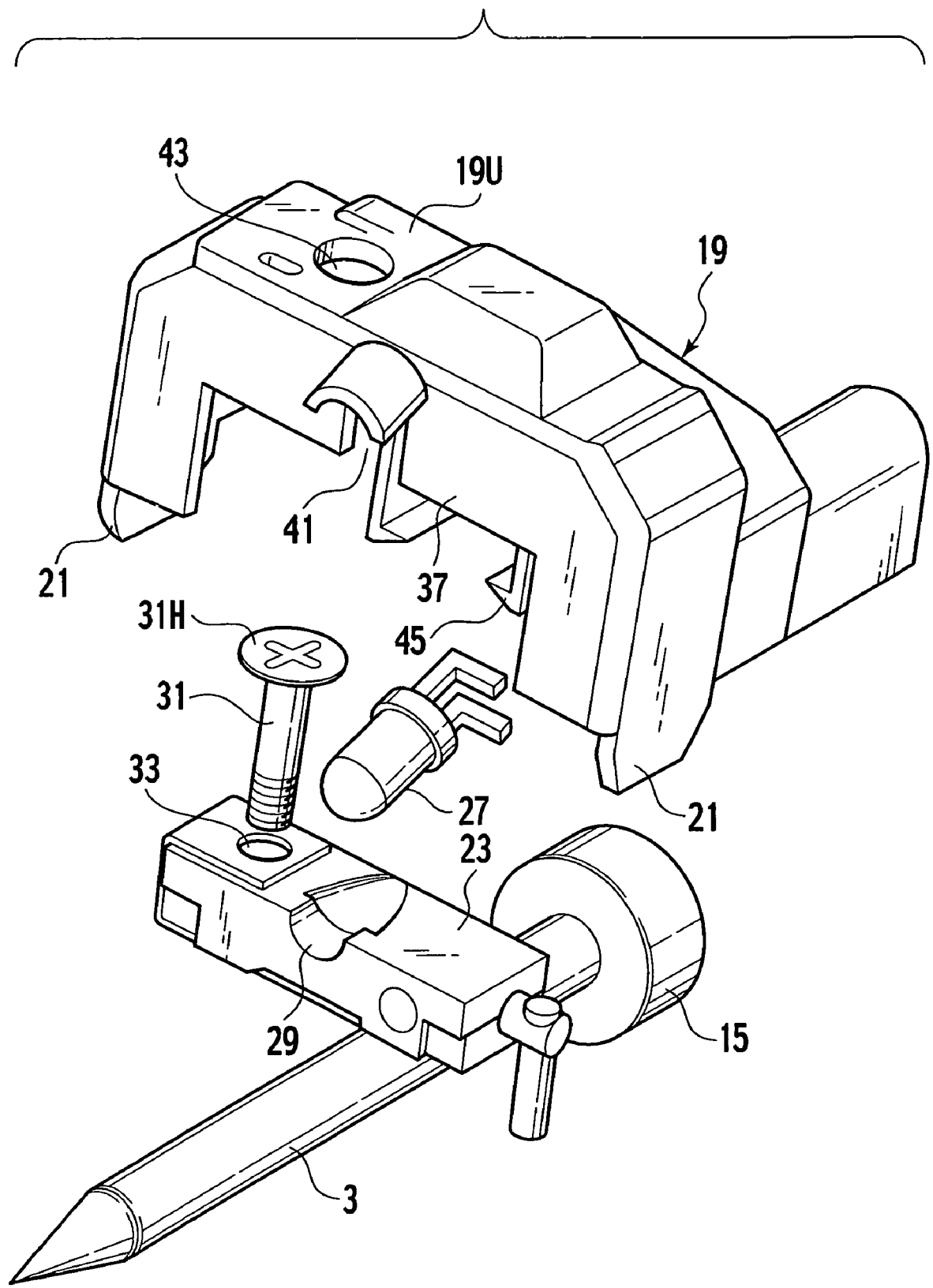
FIG. 5 is an exploded perspective view of the discharge system of FIG. 4.

Referring to FIG. 5, the electrode retainer 23 is made of metal and is formed into an approximately rectangular parallelepiped. A light-source housing 29 for housing an LED 27 as a light source for illumination is provided on the top face of the electrode retainer 23. This structure promotes downsizing of the entire configuration. The electrode retainer 23 further includes a through-hole 33 which a fitting screw 31 extends through, the fitting screw 31 being configured to fit the electrode retainer 23 to the support table 7.

Figure 6:
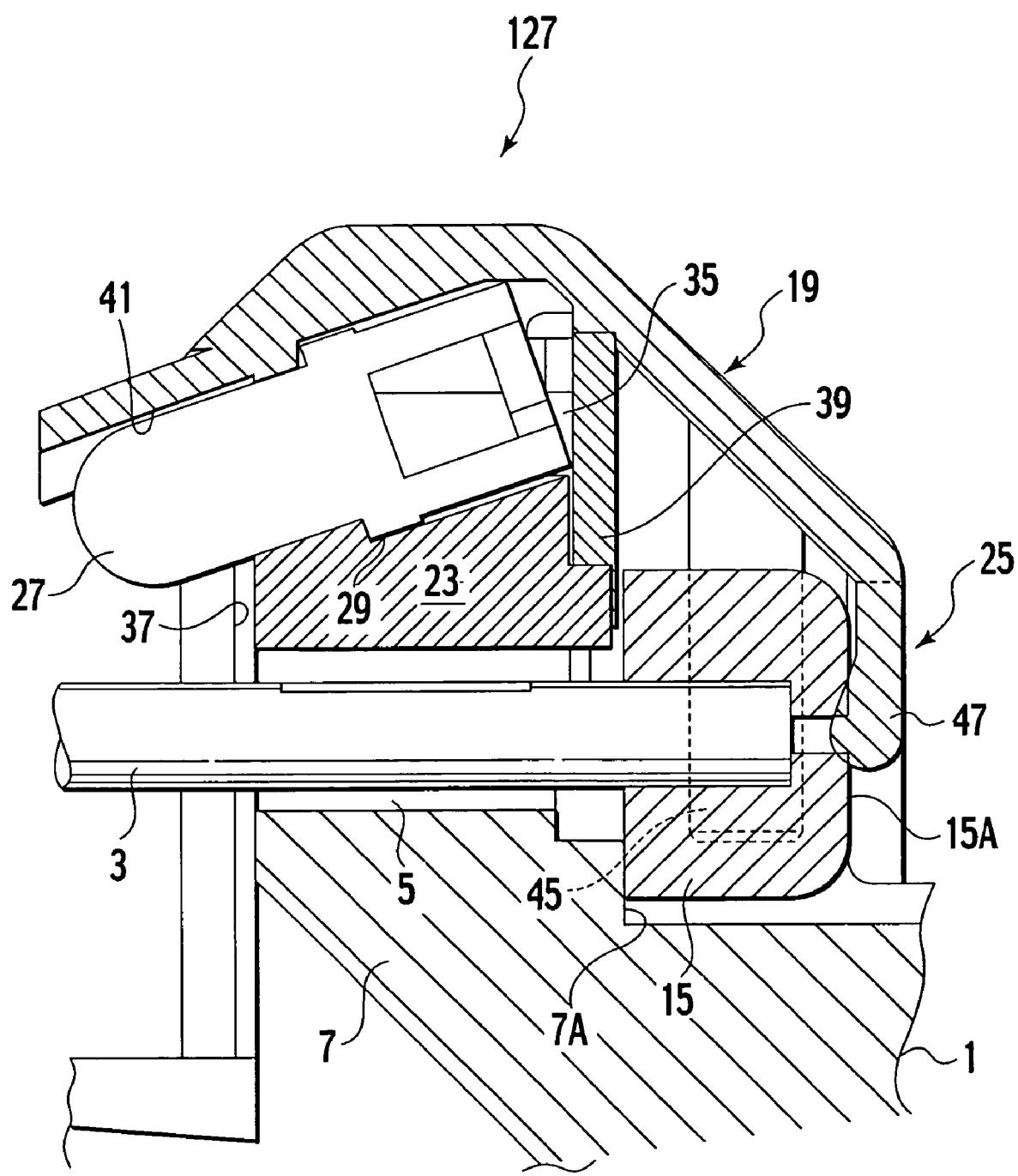
FIG. 6 is an enlarged cross-sectional view of the discharge system of FIG. 4.

Referring to FIG. 6, the cover body 19 has a housing recess 35 inside thereof for housing the electrode retainer 23. The housing recess 35 has a structure in conformity with the profile of the electrode retainer 23. The housing recess 35 includes a front wall 37 and a rear wall 39 sandwiching and retaining the electrode retainer 23 from both the front and rear sides. The front wall 37 includes a slot 41 that allows for insertion of the LED 27 in conformity to the light-source housing 29 of the electrode retainer 23.

The electrode retainer 23 is housed inside the housing recess 35 and is fixed thereto as described below. Specifically, the LED 27 is engaged with the light-source housing 29. Next, the electrode retainer 23 is lightly pushed between the front wall 37 and the rear wall 39, with the fitting screw 31 inserted into the through-hole 33, and is thereby housed in the housing recess 35. In this way, the front wall 37 and the rear wall 39 are elastically and slightly deformed to produce resilience. Accordingly, the front wall 37 and the rear wall 39 retain and fix the electrode retainer 23 therebetween.

As described above, in the state where the electrode retainer 23 is housed in and fixed to the housing recess 35, the LED 27 is engaged with the slot 41. In FIG. 5, a head 31H of the fitting screw 31 is located in a small space provided between the top face of the electrode retainer 23 and the top upper face (an top wall) 19U of the cover body 19. The top wall (the top face) 19U of the cover body 19 defines a tool-insertion hole 43 in conformity to the head 31H. The tool-insertion hole 43 allows for insertion of a tool such as a screwdriver (not shown) to turn the fitting screw 31.

The diameter of the tool-insertion hole 43 is smaller than that of the head 31H of the fitting screw 31. Accordingly, the fitting screw 31 is held inside the cover body 19 without coming off out of the through-hole 33 of the electrode retainer 23.

As it is understood from the above explanation, the head 31H of the fitting screw 31 is in the cover body 19 and is not exposed to the upper part of the cover body 19. Accordingly, an operator will not touch the screw 31 with the hand while operating fusion splicing of the optical fibers. In this way, the operation will become safer.

In FIG. 6, the electrode holder 25 is provided inside the cover body 19. The electrode holder 25 retains an electrode rod collar 15 having a large diameter, which is provided on a base end of the electrode rod 3, with the electrode rod 3 abutted against the bottom face of the electrode retainer 23 housed in and fixed to the housing recess 35. The electrode holder 25 includes a pair of L-shaped holding pawls 45 as arms facing each other. Each of the holding pawls 45 extends in the vertical direction from the cover body 19, with the end thereof bent inward. The holding pawls 45 sandwich and hold the electrode-rod collar 15 therebetween along the circumferential direction. The electrode holder 25 includes a top pressing pawl 47 configured to elastically press the top (a top face) 15A of the electrode rod collar 15 against the support table 7.

The pair of holding pawls 45 and the top pressing pawl 47 are formed integrally with the cover body 19. The electrode rod collar 15 is pressed from below and engaged between the pair of holding pawls 45 and the top pressing pawl 47. In this way, the pair of holding pawls 45 and the top pressing pawl 47 are elastically and slightly deformed outward. The pair of holding pawls 45 hold the electrode rod collar 15 therebetween along the circumferential direction by use of resilience attributable to this elastic deformation. The top-pressing pawl 47 presses the top of the electrode rod collar 15 against the support table 7. Therefore, the electrode rod 3 is held by the electrode holder 25 so as not to come off.

Next, a method of replacing the electrode rod 3 will be described with reference to FIGS. 5 and 6.

For removal and replacement of the electrode rod 3, a tool such as a screwdriver is inserted into the tool-insertion hole 43 formed on the cover body 19, and thereby the fitting screw 31 is loosened (see FIG. 5). In this way, the cover body 19, the electrode retainer 23, and the electrode 3 are collectively removed from the support table 7. After removal of the cover body 19, the electrode rod 3 is pulled out of the cover body 19, thus removing the electrode rod collar 15 from the electrode holder 25. Specifically, electrode rod collar 15 of the electrode rod 3 is held by the pair of holding pawls 45 and the top pressing pawl 47 of the electrode holder 25 provided in the cover body 19, as illustrated in FIG. 6. Accordingly, the electrode rod collar 15 of the electrode rod 3 is removed from the electrode holder 25 thereby, taking out the electrode rod 3.

After taking out the electrode rod 3 as described above, an electrode rod collar 15 of a new electrode rod 3 is pushed and housed between the pair of holding pawls 45 and the top pressing pawl 47 of the electrode holder 25. In this way, the electrode rod collar 15 of the new electrode rod 3 is held by the pair of holding pawls 45 and the top-pressing pawl 47.

In FIG. 6, thereafter, the engagement legs 21 (refer to FIG. 5) provided on the cover body 19 are engaged with the engagement recesses provided on the support table 7. With this engagement, the electrode rod 3 is engaged with and positioned in the V-groove 5 formed on the top face of the support table 7. The electrode rod collar 15 provided on the base end of the electrode rod 3 is pressed by the top-pressing pawl 47 and is positioned on the rear face 7A of the support table 7.

Specifically, the engagement legs 21 of the cover body 19 are engaged with the engagement recesses on the support table 7 so as to fit the cover body 19 to the support table 7. In this way, the electrode rod 3 is correctly positioned relative to the support table 7. Accordingly, when the electrode retainer 23 is fixed later by tightening the fitting screw 31, the electrode rod 3 is fixed in the correct position.

Next, a method of using the optical fiber fusion splicer 100 will be described.

In FIG. 3, coatings on the terminal ends of two optical fiber ribbon cords T1 and T2 are removed to expose optical fibers F1 and F2. The optical fiber ribbon cords T1 and T2 are placed on the work-tables 123a and 123b, respectively. In this way, the optical fibers F1 and F2 are put on the stages 125a and 125b, respectively. Closing of the holders 124a, 124b to the work tables 123a, 123b allows the optical fiber ribbon cords T1, T2 to be fixed between the holders 124a, 124b and the tables 123a, 123b, respectively.

The cover 122 is closed and the switches 111 and 112 (refer to FIGS. 1 and 2) are operated. The stages 125a and 125b move back and forth in the transverse direction of the grooves to position the optical fibers F1 and F2 in the grooves. Moreover, the stages 125a and 125b are displaced in the transverse direction to coincide the ends of the optical fibers F1 and F2 with each other. Then, the stages 125a and 125b are displaced in the longitudinal direction thereof, so the ends of the optical fibers F1 and F2 contact with each other.

Next, voltage is applied to the electrode rods 3. The electrodes 3 discharge between the tips thereof to produce plasma. The plasma fuses and bonds the ends of the optical fibers F1 and F2 together.

This process is displayed on the display 131 of the monitor 130 (see FIG. 1)

As it is understood from the above explanation, fitting or removal of the cover body 19 to or from the support table 7 allows the electrode retainer 23 and the electrode rod 3 to be collectively fitted or removed. During fitting of the cover body 19 to the support table 7, the electrode rod 3 is positioned at the correct position relative to the support table 7. Therefore, it is not necessary to press the electrode rod collar 15 of the electrode rod 3 during tightening the fitting screw 31, thereby allowing easy removal and replacement of the electrode rod 3.

Here, the LED 27 may be provided on one of the cover bodies 19 or LEDs 27 may be provided on both the cover bodies 19.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A covering device for a high voltage part in an optical fiber fusion splicer, comprising:
   a cover body, removably connectable to a support table, comprising a recess therein and an electrode holder adapted to removably hold an electrode rod; and
   an electrode retainer, removably connectable to the recess, adapted to press the electrode rod against the support table.

2. The covering device of claim 1, further comprising a fitting screw adapted to fix the electrode retainer to the support table.

3. The covering device of claim 2, wherein the cover body has a tool insertion hole allowing access to the fitting screw.

4. The covering device of claim 2, wherein the fitting screw extends through the electrode retainer and comprises a head interposed between the electrode retainer and a top wall of the cover body.

5. The covering device of claim 4, wherein the top wall of the cover-body has a tool insertion hole allowing the insertion of a tool to rotate the fitting screw, and a radial dimension of the tool insertion hole is smaller than a radial dimension of the head of the fitting screw.

6. The covering device of claim 1, wherein the electrode holder comprises a pair of holding pawls removably holding the electrode rod therebetween along the circumferential direction of the electrode rod, and a top pressing pawl pressing against the top of the electrode rod.

7. The covering device of claim 6, wherein the electrode rod comprises an electrode rod collar having a larger radial dimension than other portions of the electrode rod, and the pair of holding pawls and the top pressing pawl engage with the electrode rod collar.

8. The covering device of claim 1, wherein the electrode retainer comprises a light source housing adapted to house an illumination light source.

9. The covering device of claim 1, wherein the cover body is formed of an insulating material.

10. The covering device of claim 1, wherein the electrode and electrode retainer are formed of an electrically conductive material.

11. The covering device of claim 1, wherein the cover body, electrode retainer and electrode are removable in one piece from the support table.

12. The covering device of claim 1, wherein the table comprises a top face with a V-groove, and the electrode rod is pressed into the V-groove by the electrode retainer.

13. An optical fiber fusion splicer comprising:
   an electrode adapted to splice a first optical fiber and a second optical fiber;
   a retainer adapted to retain the electrode in a position relative to the optical fiber fusion splicer; and
   a cover body including: an electrode holder adapted to removably hold the electrode, and a recess therein to which the retainer removably connects.

14. The optical fiber fusion splicer of claim 13, wherein the electrode holder comprises a first arm and a second arm having the electrode interposed between the first and second arms.

15. The optical fiber fusion splicer of claim 14, wherein at least one of the first and second arms has a pawl engaged with the electrode.

16. The optical fiber fusion splicer of claim 13, wherein the retainer is electrically connected to the electrode.

17. The optical fiber fusion splicer of claim 13, further comprising a positioner configured to position the first and second optical fibers in positions relative to the electrode.

18. The optical fiber fusion splicer of claim 13, wherein the cover body is removably attached to the optical fiber fusion splicer, and holds the electrode and retainer both when attached and detached from the optical fiber fusion splicer.

19. The covering device of claim 1, wherein the electrode holder comprises a through hole which the electrode is passed through.

20. The optical fiber fusion splicer of claim 1, wherein the holder comprises a through hole which the electrode is passed through.

* * * * *